US006894996B2

United States Patent
Lee

(10) Patent No.: US 6,894,996 B2
(45) Date of Patent: May 17, 2005

(54) APPARATUS AND METHOD FOR SEARCHING A BASE STATION IN AN ASYNCHRONOUS MOBILE COMMUNICATIONS SYSTEM

(75) Inventor: Won-Ho Lee, Daegukwangyeok-shi (KR)

(73) Assignee: Samsung Electronics Co., Ltd. (KR)

( * ) Notice: Subject to any disclaimer, the term of this patent is extended or adjusted under 35 U.S.C. 154(b) by 870 days.

(21) Appl. No.: 09/886,303

(22) Filed: Jun. 21, 2001

(65) Prior Publication Data

US 2002/0044538 A1 Apr. 18, 2002

(30) Foreign Application Priority Data

Sep. 9, 2000 (KR) .......................................... 2000-53782

(51) Int. Cl.⁷ .......................... H04J 3/00; H04B 7/216; H04Q 7/00
(52) U.S. Cl. ....................... 370/337; 370/335; 370/342; 370/208; 455/515; 455/450
(58) Field of Search ................................ 370/208–210, 370/320–324, 331–350, 479–503; 455/432, 455, 450, 515, 524, 574

(56) References Cited

U.S. PATENT DOCUMENTS

| | | | | |
|---|---|---|---|---|
| 5,726,982 A | * | 3/1998 | Witter | 370/335 |
| 6,112,081 A | * | 8/2000 | Namura et al. | 455/424 |
| 6,385,180 B1 | * | 5/2002 | Maru | 370/335 |

(Continued)

FOREIGN PATENT DOCUMENTS

| | | |
|---|---|---|
| JP | 07-297805 | 11/1995 |
| JP | 09-148980 | 6/1997 |
| JP | 11-068618 | 3/1999 |
| JP | 2000-138657 | 5/2000 |

OTHER PUBLICATIONS

Japanese Office Action dated Mar. 23, 2004 issued in a counterpart application, namely, Appln. No. 2001-247406.
Wang et al., "Cell Search in W–CDMA", IEEE Journal on Selected Areas in Communications, vol. 18, No. 8, Aug. 2000, pp. 1470–1482.
Higuchi et al., "Experimental Evaluation of 3–Step Cell Search Method in W–CDMA Mobile Radio", 2000 IEEE, pp. 303–307.

(Continued)

Primary Examiner—Man U. Phan
(74) Attorney, Agent, or Firm—Dilworth & Barrese, LLP

(57) ABSTRACT

Disclosed is an apparatus and method for searching a base station in a mobile communications system, in which a mobile station acquires slot timing synchronization from a first signal on a primary sync channel (P-SCH) out of the P-SCH and a secondary sync channel (S-SCH) used for base station search, acquires frame timing synchronization (Fsync) from a second signal on the S-SCH, and determines a primary scrambling code group (PSCG) corresponding to the scrambling codes used by the respective base stations. The method comprises calculating and accumulating P-SCH RSSI values from the first signal at every slot and comparing the accumulated P-SCH RSSI values with first and second accumulation thresholds and providing the first and second search commands; and calculating S-SCH channel received signal strength indicator (RSSI) values from the second signal at every slot in one frame, and updating S-SCH RSSI values corresponding to the one frame as energy matrix values; calculating energy hypotheses corresponding to the energy matrix values using the energy matrix values and a predetermined secondary sync code (SSC) table in response to a first search command, and determining energy hypotheses having a value higher than a predetermined threshold as passed hypotheses; and calculating energy values for the passed hypotheses using the determined passed hypotheses and the SSC table in response to a second search command, and determining an energy hypothesis having a maximum energy as the Fsync and the PSCG.

7 Claims, 7 Drawing Sheets

U.S. PATENT DOCUMENTS

| | | | |
|---|---|---|---|
| 6,393,282 B1 * | 5/2002 | Iimori | 455/432.1 |
| 6,728,229 B1 * | 4/2004 | Lim | 370/335 |
| 2002/0002055 A1 * | 1/2002 | Nitta | 455/515 |
| 2002/0024942 A1 * | 2/2002 | Tsuneki et al. | 370/335 |
| 2002/0041581 A1 * | 4/2002 | Aramaki | 370/335 |

OTHER PUBLICATIONS

Nystrom et al., "Comparison of Cell Search Methods for Asynchronous Wideband CDMA Cellular System", 1998 IEEE, pp. 783–787.

* cited by examiner

| PSCG | SLOT NUMBER | | | | | | | | | | | | | | |
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| GROUP 1 | 1 | 1 | 2 | 8 | 9 | 10 | 15 | 8 | 10 | 16 | 2 | 7 | 15 | 7 | 16 |
| GROUP 2 | 1 | 1 | 5 | 16 | 7 | 3 | 14 | 16 | 3 | 10 | 5 | 12 | 14 | 12 | 10 |
| GROUP 3 | 1 | 2 | 1 | 15 | 5 | 5 | 12 | 16 | 6 | 11 | 2 | 16 | 11 | 15 | 12 |
| GROUP 4 | 1 | 2 | 3 | 1 | 8 | 6 | 5 | 2 | 5 | 8 | 4 | 4 | 6 | 3 | 7 |
| GROUP 5 | 1 | 2 | 16 | 6 | 6 | 11 | 15 | 5 | 12 | 1 | 15 | 12 | 16 | 11 | 2 |
| GROUP 6 | 1 | 3 | 4 | 7 | 4 | 1 | 5 | 5 | 3 | 6 | 2 | 8 | 7 | 6 | 8 |
| GROUP 7 | 1 | 4 | 11 | 3 | 4 | 10 | 9 | 2 | 11 | 2 | 10 | 12 | 12 | 9 | 3 |
| GROUP 8 | 1 | 5 | 6 | 6 | 14 | 9 | 10 | 2 | 13 | 9 | 2 | 5 | 14 | 1 | 13 |
| GROUP 9 | 1 | 6 | 10 | 10 | 4 | 11 | 7 | 13 | 16 | 11 | 13 | 6 | 4 | 1 | 16 |
| GROUP 10 | 1 | 6 | 13 | 2 | 14 | 2 | 6 | 5 | 5 | 13 | 10 | 9 | 1 | 14 | 10 |
| GROUP 11 | 1 | 7 | 8 | 5 | 7 | 2 | 4 | 3 | 8 | 3 | 2 | 6 | 6 | 4 | 5 |
| GROUP 12 | 1 | 7 | 10 | 9 | 16 | 7 | 9 | 15 | 1 | 8 | 16 | 8 | 15 | 2 | 2 |
| GROUP 13 | 1 | 8 | 12 | 9 | 9 | 4 | 13 | 16 | 5 | 1 | 13 | 5 | 12 | 4 | 8 |
| GROUP 14 | 1 | 8 | 14 | 10 | 14 | 1 | 15 | 15 | 8 | 5 | 11 | 4 | 10 | 5 | 4 |
| GROUP 15 | 1 | 9 | 2 | 15 | 15 | 16 | 10 | 7 | 8 | 1 | 10 | 8 | 2 | 16 | 9 |
| GROUP 16 | 1 | 9 | 15 | 6 | 16 | 2 | 13 | 14 | 10 | 11 | 7 | 4 | 5 | 12 | 3 |
| GROUP 17 | 1 | 10 | 9 | 11 | 15 | 7 | 6 | 4 | 16 | 5 | 2 | 12 | 13 | 3 | 14 |
| GROUP 18 | 1 | 11 | 14 | 4 | 13 | 2 | 9 | 10 | 12 | 16 | 8 | 5 | 3 | 15 | 6 |
| GROUP 19 | 1 | 12 | 12 | 13 | 14 | 7 | 2 | 8 | 14 | 2 | 1 | 13 | 11 | 8 | 11 |
| GROUP 20 | 1 | 12 | 15 | 5 | 4 | 14 | 3 | 16 | 7 | 8 | 6 | 2 | 10 | 11 | 13 |
| GROUP 21 | 1 | 15 | 4 | 3 | 7 | 6 | 10 | 13 | 12 | 5 | 14 | 16 | 8 | 2 | 11 |
| GROUP 22 | 1 | 16 | 3 | 12 | 11 | 9 | 13 | 5 | 8 | 2 | 14 | 7 | 4 | 10 | 15 |
| GROUP 23 | 2 | 2 | 5 | 10 | 16 | 11 | 3 | 10 | 11 | 8 | 5 | 13 | 3 | 13 | 8 |
| GROUP 24 | 2 | 2 | 12 | 3 | 15 | 5 | 8 | 3 | 5 | 14 | 12 | 9 | 8 | 9 | 14 |
| GROUP 25 | 2 | 3 | 6 | 16 | 12 | 16 | 3 | 13 | 13 | 6 | 7 | 9 | 2 | 12 | 7 |
| GROUP 26 | 2 | 3 | 8 | 2 | 9 | 15 | 14 | 3 | 14 | 9 | 5 | 5 | 15 | 8 | 12 |
| GROUP 27 | 2 | 4 | 7 | 9 | 5 | 4 | 9 | 11 | 2 | 14 | 5 | 14 | 11 | 16 | 16 |

FIG. 4A

|          | #0 | #1 | #2 | #3 | #4 | #5 | #6 | #7 | #8 | #9 | #10 | #11 | #12 | #13 | #14 |
|----------|----|----|----|----|----|----|----|----|----|----|----|----|----|----|----|
| GROUP 28 | 2  | 4  | 13 | 12 | 12 | 7  | 15 | 10 | 5  |    | 2  | 15 | 5  | 13 | 7  | 4  |
| GROUP 29 | 2  | 5  | 9  | 9  | 3  | 12 | 8  | 14 | 15 | 12 | 14 | 5  | 3  | 2  | 15 |
| GROUP 30 | 2  | 5  | 11 | 7  | 2  | 11 | 9  | 4  | 16 | 7  | 16 | 9  | 14 | 14 | 4  |
| GROUP 31 | 2  | 6  | 2  | 13 | 3  | 3  | 12 | 9  | 7  | 16 | 6  | 9  | 16 | 13 | 12 |
| GROUP 32 | 2  | 6  | 9  | 7  | 7  | 16 | 13 | 3  | 12 | 2  | 13 | 12 | 9  | 16 | 6  |
| GROUP 33 | 2  | 7  | 12 | 15 | 2  | 12 | 4  | 10 | 13 | 15 | 13 | 4  | 5  | 5  | 10 |
| GROUP 34 | 2  | 7  | 14 | 16 | 5  | 9  | 2  | 9  | 16 | 11 | 11 | 5  | 7  | 4  | 14 |
| GROUP 35 | 2  | 8  | 5  | 12 | 5  | 2  | 14 | 14 | 8  | 15 | 3  | 9  | 12 | 15 | 9  |
| GROUP 36 | 2  | 9  | 13 | 4  | 2  | 13 | 8  | 11 | 6  | 4  | 6  | 8  | 15 | 15 | 11 |
| GROUP 37 | 2  | 10 | 3  | 2  | 13 | 16 | 8  | 10 | 8  | 13 | 11 | 11 | 16 | 3  | 5  |
| GROUP 38 | 2  | 11 | 15 | 3  | 11 | 6  | 14 | 10 | 15 | 10 | 6  | 7  | 7  | 14 | 3  |
| GROUP 39 | 2  | 16 | 4  | 5  | 16 | 14 | 7  | 11 | 4  | 11 | 14 | 9  | 9  | 7  | 5  |
| GROUP 40 | 3  | 3  | 4  | 6  | 11 | 12 | 13 | 6  | 12 | 14 | 4  | 5  | 13 | 5  | 14 |
| GROUP 41 | 3  | 3  | 6  | 5  | 16 | 9  | 15 | 5  | 9  | 10 | 6  | 4  | 15 | 4  | 10 |
| GROUP 42 | 3  | 4  | 5  | 14 | 4  | 6  | 12 | 13 | 5  | 13 | 6  | 11 | 11 | 12 | 14 |
| GROUP 43 | 3  | 4  | 9  | 16 | 10 | 4  | 16 | 15 | 3  | 5  | 10 | 5  | 15 | 6  | 6  |
| GROUP 44 | 3  | 4  | 16 | 10 | 5  | 10 | 4  | 9  | 9  | 16 | 15 | 6  | 3  | 5  | 15 |
| GROUP 45 | 3  | 5  | 12 | 11 | 14 | 5  | 11 | 13 | 3  | 6  | 14 | 6  | 13 | 4  | 4  |
| GROUP 46 | 3  | 6  | 4  | 10 | 6  | 5  | 9  | 15 | 4  | 15 | 5  | 16 | 16 | 9  | 10 |
| GROUP 47 | 3  | 7  | 8  | 8  | 16 | 11 | 12 | 4  | 15 | 11 | 4  | 7  | 16 | 3  | 15 |
| GROUP 48 | 3  | 7  | 16 | 11 | 4  | 15 | 3  | 15 | 11 | 12 | 12 | 4  | 7  | 8  | 16 |
| GROUP 49 | 3  | 8  | 7  | 15 | 4  | 8  | 15 | 12 | 3  | 16 | 4  | 16 | 12 | 11 | 11 |
| GROUP 50 | 3  | 8  | 15 | 4  | 16 | 4  | 8  | 7  | 7  | 15 | 12 | 11 | 3  | 16 | 12 |
| GROUP 51 | 3  | 10 | 10 | 15 | 16 | 5  | 4  | 6  | 16 | 4  | 3  | 15 | 9  | 6  | 9  |
| GROUP 52 | 3  | 13 | 11 | 5  | 4  | 12 | 4  | 11 | 6  | 6  | 5  | 3  | 14 | 13 | 12 |
| GROUP 53 | 3  | 14 | 7  | 9  | 14 | 10 | 13 | 8  | 7  | 8  | 10 | 4  | 4  | 13 | 9  |
| GROUP 54 | 5  | 5  | 8  | 14 | 16 | 13 | 6  | 14 | 13 | 7  | 8  | 15 | 6  | 15 | 7  |

FIG. 4B

|  | #0 | #1 | #2 | #3 | #4 | #5 | #6 | #7 | #8 | #9 | #10 | #11 | #12 | #13 | #14 |
|---|---|---|---|---|---|---|---|---|---|---|---|---|---|---|---|
| GROUP 55 | 5 | 5 | 6 | 11 | 7 | 10 | 8 | 5 | 8 | 7 | 12 | 12 | 10 | 6 | 9 | 11 |
| GROUP 56 | 5 | 6 | 13 | 8 | 13 | 5 | 7 | 7 | 6 | 16 | 14 | 15 | 8 | 16 | 15 |
| GROUP 57 | 5 | 7 | 9 | 10 | 7 | 11 | 6 | 12 | 9 | 12 | 11 | 8 | 8 | 6 | 10 |
| GROUP 58 | 5 | 9 | 6 | 8 | 10 | 9 | 8 | 12 | 5 | 11 | 10 | 11 | 12 | 7 | 7 |
| GROUP 59 | 5 | 10 | 10 | 12 | 8 | 11 | 9 | 7 | 8 | 9 | 5 | 12 | 6 | 7 | 6 |
| GROUP 60 | 5 | 10 | 12 | 6 | 5 | 12 | 8 | 9 | 7 | 6 | 7 | 8 | 11 | 11 | 9 |
| GROUP 61 | 5 | 13 | 15 | 15 | 14 | 8 | 6 | 7 | 16 | 8 | 7 | 13 | 14 | 5 | 16 |
| GROUP 62 | 9 | 10 | 13 | 10 | 11 | 15 | 15 | 9 | 16 | 12 | 14 | 13 | 16 | 14 | 11 |
| GROUP 63 | 9 | 11 | 12 | 15 | 12 | 9 | 13 | 13 | 11 | 14 | 10 | 16 | 15 | 14 | 16 |
| GROUP 64 | 9 | 12 | 10 | 15 | 13 | 14 | 9 | 14 | 15 | 11 | 11 | 13 | 12 | 16 | 10 |

FIG. 4C

APPARATUS AND METHOD FOR SEARCHING A BASE STATION IN AN ASYNCHRONOUS MOBILE COMMUNICATIONS SYSTEM

PRIORITY

This application claims priority to an application entitled "Apparatus and Method for Searching Base Station in an Asynchronous Mobile Communications System" filed in the Korean Industrial Property Office on Sep. 9, 2000 and assigned Serial No. 2000-53782, the contents of which are hereby incorporated by reference.

BACKGROUND OF THE INVENTION

1. Field of the Invention

The present invention relates generally to a mobile communications system, and in particular, to an apparatus and method for performing a base station search in an asynchronous mobile communications system.

2. Description of the Related Art

With the rapid development of mobile communication technology, future mobile communication systems will provide a data service and a moving image service as well as the existing voice service. The standardization of such a system is now in progress. The future mobile communications system can be divided into a synchronous mobile communications system led by the United States and an asynchronous mobile communications system led by the European Community. The European asynchronous mobile communications system is commonly referred to as a "Universal Mobile Telecommunications System (UMTS)".

The asynchronous UMTS system must perform a base station (or cell) search operation to acquire synchronization with a specific base station through given synchronization (sync) channels. The two sync channels used for a base station search in the UMTS system, are included in a downlink physical channel (DPCH). One channel is a primary sync channel (P-SCH) and the other is a secondary sync channel (S-SCH). The SPEC in connection with the UMTS sync channel can be found in ETSI TS 25,211 TS 25,213 Release 99. As illustrated in FIG. 1, the P-SCH has a sequence length of 256 chips and constitutes a first 256-chip period of every slot (1 slot=2560 chips). A mobile station of the UMTS system acquires slot timing synchronization using the P-SCH.

A mobile station of the UMTS system the performs P-SCH search prior to the S-SCH search. After slot timing synchronization by the P-SCH search, frame timing synchronization (Fsync) is acquired and a primary scrambling code group is determined by the S-SCH search. The Fsync and the PSCG determination by the S-SCH search are performed based on the slot timing synchronization by the P-SCH search.

FIG. 2 is a block diagram illustrating a conventional apparatus for performing S-SCH search. The apparatus includes an S-SCH RSSI (Secondary Synchronization Channel Received Signal Strength Indicator) calculator 100, an S-SCH energy matrix update part 102, and an S-SCH searcher 104.

Referring to FIGS. 1 and 2, a conventional S-SCH search operation will be described below. In the UMTS system, one frame has a period of 10 ms and includes 15 slots (SLOT#0–SLOT#14). Each base station is assigned one of 512 primary scrambling codes, and the mobile station must first determine the PSCG in order to find out the unique primary scrambling codes used by the respective base stations. The 512 primary scrambling codes are associated with 64 PSCGs, and each PSCG includes 8 primary scrambling codes (512=64×8). In the 64 PSCGs, a PSCG includes the primary scrambling codes #0–#7, a $2^{nd}$ PSCG includes the primary scrambling codes #8–#15, . . . , and a $64^{th}$ PSCG includes the primary scrambling codes #504–#511.

In the S-SCH search operation of the mobile station, the S-SCH RSSI calculator 100 calculates 16 energy values $E_{m,k}$ at an $m^{th}$ slot (m=1,2, . . .) as expressed by Equation (1) below, in order to acquire the Fsync and determine the PSCG. Therefore, the S-SCH RSSI calculator 100 calculates 16 energy values at every slot.

$$E_{m,k}=[E_{m,k,I}]^2+[E_{m,k,Q}]^2, k=1,\ldots,16 \quad (1)$$

where $$E_{m,k,I} = \sum_{i=0}^{255} r_I(m, i) \cdot SSC_k(i), \text{ and } E_{m,k,Q} = \sum_{i=0}^{255} r_Q(m, i) \cdot SSC_k(i).$$

In Equation (1), $r_I(m,i)$ and $r_Q(m,i)$ indicate an $i^{th}$ I-channel signal and an $i^{th}$ Q-channel signal received respectively at the $m^{th}$ slot (where i=0–255), and $SSC_k(i)$ indicates an $i^{th}$ chip of a $k^{th}$ SSC (Secondary Sync Code).

The 16 energy values $E_{m,k}$, calculated by the S-SCH RSSI calculator 100 at every slot, are provided to the S-SCH energy matrix update part 102, which updates a 15×16 matrix S, shown below, using the energy values $E_{m,k}$. In the matrix S, $S_{(i,j)}$ indicates an element in an $i^{th}$ row and a $j^{th}$ column.

In the initial state: $S_{(i,j)}$=0, i=1,2, . . . , 15 and j=1,2, . . . , 16
At the $m^{th}$ slot (m=1,2,3, . . . ):
if (m mod 15)==0
i=15;
else
i=(m mod 15);
$S_{(i,j)}=S_{(i,j)}+E_{(i,j)}$;
Hereinafter, the matrix S will be defined as an S-SCH energy matrix.

The S-SCH energy matrix, constantly updated by the S-SCH energy matrix update part 102 is provided to the S-SCH searcher 104 when a search start command Start_SEARCH (which is transitioning from '0' to '1') is applied to the S-SCH searcher 104 at predetermined time intervals.

The S-SCH searcher 104 acquires Fsync and determines a primary scrambling code group number PSCG_No by performing the S-SCH search using the S-SCH energy matrix constantly updated by the S-SCH energy matrix update part 102, an SSC table for the S-SCH, illustrated in FIGS. 4A to 4C, and Equation (2) given below. A detailed description will be made below regarding how to acquire the Fsync and determine the PSCG_No.

As a typical method for searching the S-SCH, the S-SCH searcher 104 calculates S-SCH energy for each of the S-SCH patterns associated with the 64 PSCGs (hereinafter, referred to as "64 S-SCH patterns") in the SSC table illustrated in FIGS. 3A to 3C. Since the Fsync is not acquired during the S-SCH search, the 64 S-SCH patterns illustrated in FIGS. 4A to 4C, shifted by L slots (L=0, . . . , 14), can all become a hypothesis of the Fsync and the PSCG_No. The number of hypotheses searched to acquire the Fsync and determine the PSCG (i.e., the number of hypotheses to be energy-calculated) is 960 (=64×15). The search for a $(p,q)^{th}$ hypothesis (where p=1,2, ..., 64 and q=1,2, ..., 15) out of the 960 hypotheses is calculated in $(p,q)^{th}$ S-SCH energy as expressed in Equation (2) below.

$$(p, q)^{th} \ S-SCH \ \text{energy} = \sum_{l=0}^{14} S_{(l+1, t(p,q,l))} \quad (2)$$

where t(p,q,l)=SSC of group p at slot ((q−1+l) mod 15) (as illustrated in the SSC table in FIGS. 3A to 3C).

The S-SCH searcher 104 can acquire Fsync and determine a PSCG of the base station by searching the hypothesis having the maximum energy out of the 960 hypotheses, using Equation (2).

However, the conventional apparatus has the following disadvantages:

(1) Searching for all the hypotheses using equation (2) with a same S-SCH observation time requires a long S-SCH search time.

(2) Searching for the hypotheses after observing the S-SCH energy for a predetermined time period (e.g. a 1 or 2-frame period) is inefficient because the channel conditions may very with the passage of time. For example, when the Signal-to-Noise Ratio (SNR) is very low, a very long time period is required for S-SCH energy observation to guarantee high detection probability and low false alarm probability. Thus, in this case, using a predetermined observation may result in a decrease of the detection probability and an increase in false alarm probability. On the contrary, when the SNR is very high, S-SCH energy observation over a short time period can result in good S-SCH search performance. This means that using a predetermined observation time may result in an unnecessary increase in the search time.

SUMMARY OF THE INVENTION

It is, therefore, an object of the present invention to provide an apparatus and method for increasing a search speed of an S-SCH in a base station search process in an asynchronous mobile communications system.

It is another object of the present invention to provide an apparatus and method for reducing a search time of a secondary sync channel in an S-SCH search process.

It is yet another object of the present invention to provide a method for decreasing a false alarm probability and increasing a detection probability in an S-SCH search process.

It is also another object of the present invention to provide a method and an apparatus for determining the start point of the S-SCH search in Searching Base Station in an Asynchronous Mobile Communication System.

In accordance with one aspect of the present invention, a method for searching a base station in a mobile communications system is provided, in which a mobile station acquires slot timing synchronization from a first signal on a P-SCH out of the P-SCH and a S-SCH used for the base station search, acquires Fsync from a second signal on the S-SCH, and determines a PSCG corresponding to the scrambling codes used by the respective base stations. The method comprises the following steps: (1) calculating and accumulating P-SCH RSSI values withy first and second accumulation thresholds and providing the first and second search commands; (2) calculating S-SCH received signal strength indicator (RSSI) values from the second signal at every slot in one frame, and updating RSSI values corresponding to the one frame as energy matrix values; (3) calculating energy hypotheses corresponding to the energy matrix values using the energy matrix values and a predetermined SSC table in response to a first search command, and determining energy hypotheses having a higher value than a predetermined threshold as passed hypotheses; and (4) calculating energy values for the passed hypotheses using the determined passed hypotheses and the SSC table in response to a second search command, and determining an energy hypothesis having a maximum energy as the Fsync and the PSCG.

In accordance with another aspect of the present invention, an apparatus for searching a base station in a mobile communications system is provided, in which a mobile station acquires slot timing synchronization from a first signal on a P-SCH out of the P-SCH and a S-SCH used for the base station search, acquires Fsync from a second signal on the S-SCH, and determines a PSCG corresponding to the primary scrambling codes used by the respective base stations. The apparatus utilizes the following components: (1) a search command provider for calculating and accumulating P-SCH RSSI values from the first signal at every slot, comparing the accumulated P-SCH RSSI values with first and second accumulation thresholds, and providing first and second search commands; (2) a secondary sync channel signal energy calculating and updating part for calculating S-SCH RSSI values from the second signal at every slot, and updating S-SCH RSSI values corresponding to the one frame, as energy matrix values; and (3) a S-SCH searcher for performing a first search process of calculating energy hypotheses corresponding to the energy matrix values using the energy matrix values and a predetermined SSC table in response to the first search command and determining energy hypotheses having a value higher than a predetermined threshold as passed hypotheses, and a second search process of calculating energy values for the passed hypotheses using the determined passed hypotheses and the SSC table in response to the second search command and determining an energy hypothesis having a maximum energy as the Fsync and the PSCG.

BRIEF DESCRIPTION OF THE DRAWINGS

The above and other objects, features and advantages of the present invention will become more apparent from the following detailed description when taken in conjunction with the accompanying drawings in which:

FIGS. 4A to 4C are diagrams illustrating an SSC (Secondary Sync Code) table for an S-SCH.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 3:
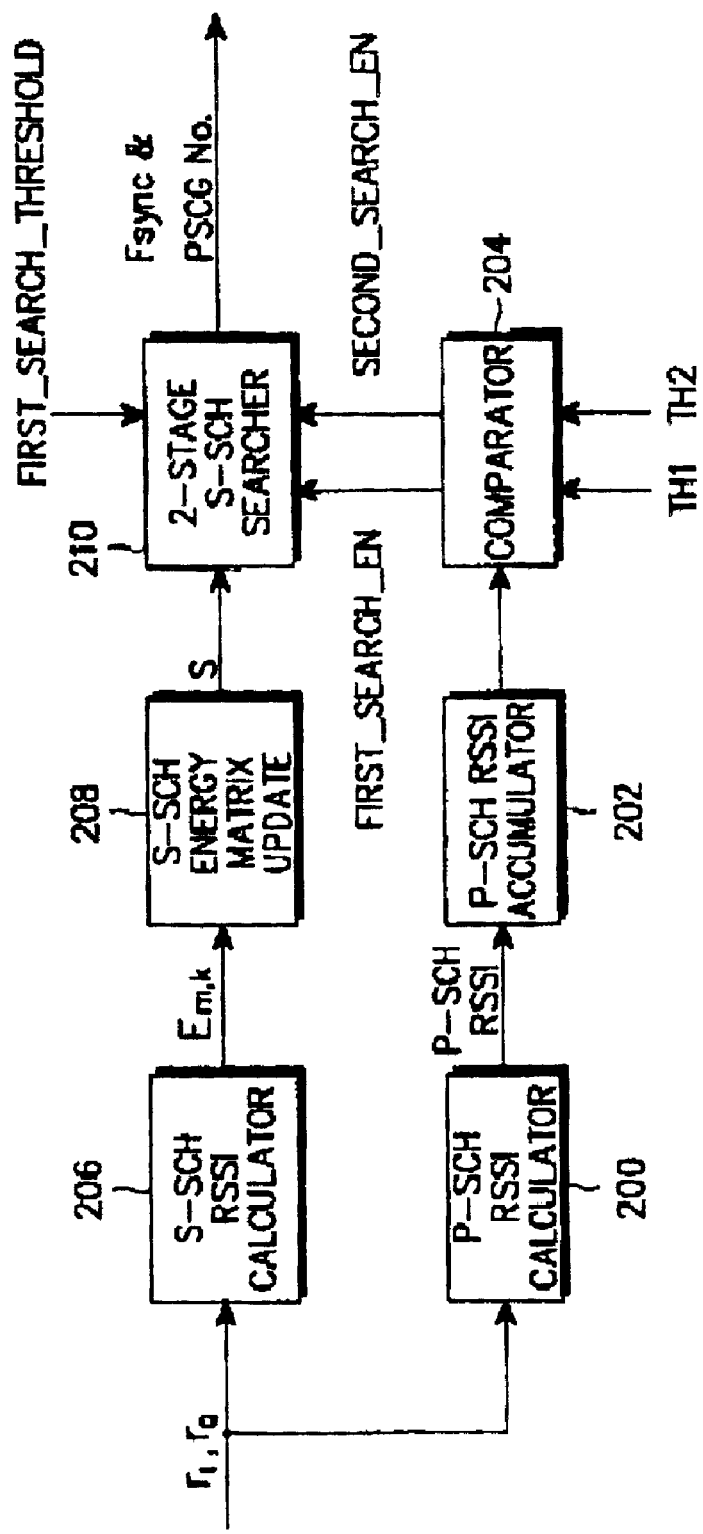
FIG. 3 is a block diagram illustrating an apparatus for searching an S-SCH according to an embodiment of the present invention.

FIG. 3 is a block diagram illustrating an apparatus for searching a secondary sync channel (S-SCH) according to an embodiment of the present invention. The apparatus includes a P-SCH RSSI (Primary Sync Channel Received Signal Strength Indicator) calculator 200, a P-SCH RSSI accumulator 202, a comparator 204, an S-SCH RSSI calculator 206, an S-SCH energy matrix update part 208, and a 2-stage S-SCH searcher 210.

According to an embodiment of the present invention: (1) the apparatus of the present invention performs the S-SCH search in two steps; and (2) the start point of the S-SCH search is determined by using the accumulated P-SCH RSSI value.

First, it is a feature of the 2-stage search that the 2-stage S-SCH searcher 210 of FIG. 3 sequentially performs a first search process and a second search process. A brief description of the first and second search processes will be made hereinbelow.

(1) In the first search process, the 2-stage S-SCH searcher 210 selects, of a total of the 960 hypothesis searched, only the hypotheses having an energy level greater than a predetermined threshold FIRST_SEARCH_THRESHOLD. Rather than selecting the hypotheses having the maximum energy out of the 960 hypotheses, using a received signal observed for a short time period, the 2-stage S-SCH searcher 210 selects the hypotheses having the highest probability of having the maximum energy in the.

(2) In the second search process, the 2-stage S-SCH searcher 210 determines the hypothesis having the maximum energy out of the hypotheses selected in the first search process, and then determines a Fsync and a PSCG according to the determined hypothesis. In the second search process, the 2-stage S-SCH searcher 210 performs a fine search using the received signal observed for a relatively longer time period than the observation time period used in the first search process, and thereafter, determines the Fsync and the PSCG. Compared with the first search process, the second search process has a longer search time per hypothesis, but has a fewer number of hypotheses to search. As a result, the total S-SCH search time is much shorter than that of the prior art.

Figure 1:
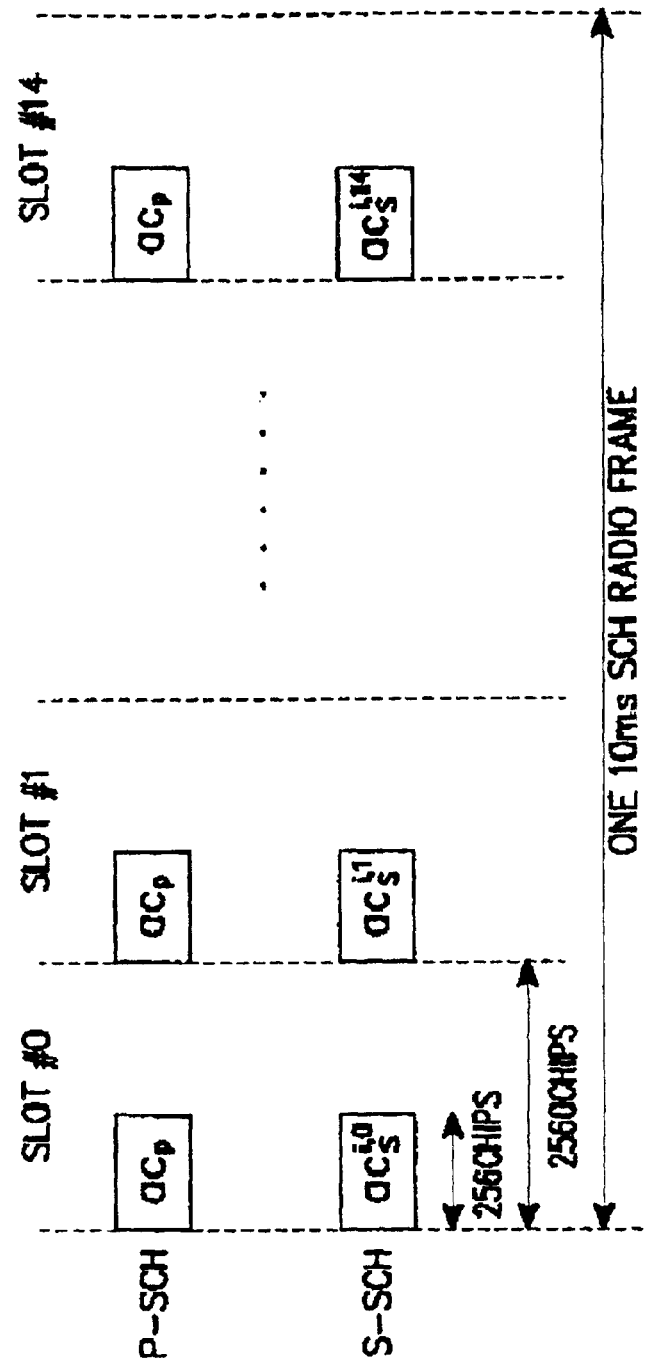
FIG. 1 is a diagram illustrating a sync channel in the UMTS system.
Figure 2:
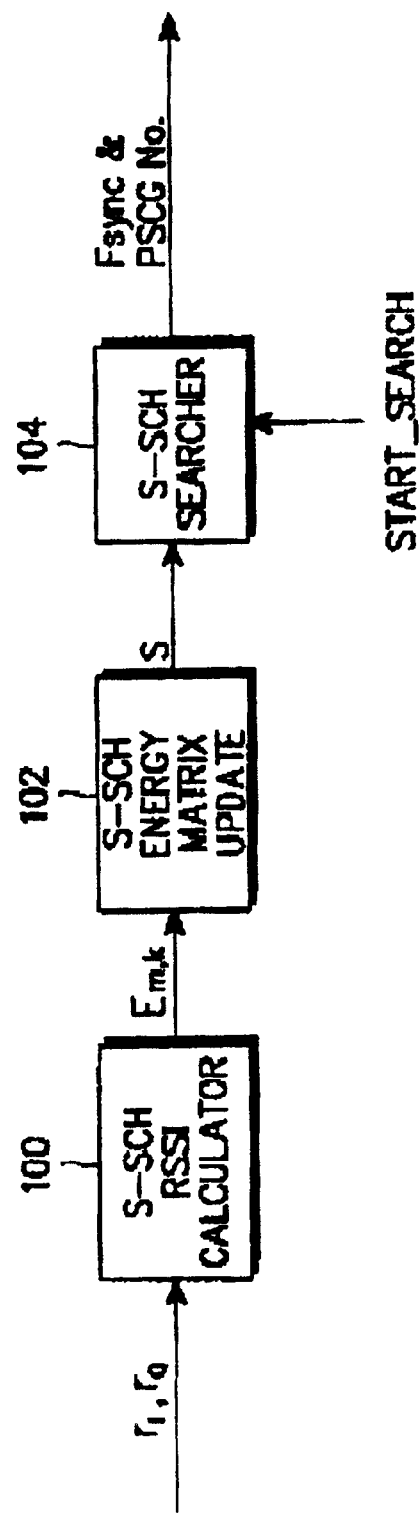
FIG. 2 is a block diagram illustrating a conventional apparatus for searching a secondary sync channel (S-SCH)

To enable the 2-stage S-SCH searcher 210 to perform the first and second search processes, the apparatus according to an embodiment of the present invention includes the P-SCH RSSI calculator 200, the P-SCH RSSI accumulator 202, and the comparator 204 in addition to the S-SCH RSSI calculator 206 and the S-SCH energy matrix update part 208, which have the same operation as the S-SCH RSSI calculator 100 and the S-SCH energy matrix update part 102 illustrated in FIG. 2.

In an embodiment of the present invention, the P-SCH RSSI calculator 200, the P-SCH RSSI accumulator 202 and the comparator 204 determine the start points of the first and second search processes. A key factor used in this invention in determining the start points of the search process is that an RSSI (Received Signal Strength Indicator) of the S-SCH channel is equal to that of the P-SCH channel when both slot and frame timing synchronization are acquired. Using this fact, the embodiment measures and accumulates the RSSI of the P-SCH and starts the first and second search processes when the accumulated RSSI value exceeds predetermined thresholds TH1 and TH2 given as system parameters, respectively.

A detailed description will be made regarding an operation of determining the start points of the first and second searches. The P-SCH RSSI calculator 200 measures a received signal strength indicator P-SCH_RSSI of the P-SCH at every slot. The measured P-SCH_RSSI is provided to the P-SCH RSSI accumulator 202, which accumulates the provided P-SCH_RSSI and provides the accumulated P-SCH_RSSI to the comparator 204 at every slot. The comparator 204 compares the accumulated P-SCH_RSSI provided from the P-SCH RSSI accumulator 202 with predetermined thresholds TH1 and TH2, and provides the 2-stage S-SCH searcher 210 with a first search enable signal FIRST_SEARCH_EN and a second search enable signal SECOND_SEARCH_EN, which are given as follows:

$$\text{FIRST\_SEARCH\_EN} = \begin{cases} 1, \text{ accumulated P}-\text{SCH\_RSSI} > \text{TH1} \\ 0, \text{ otherwise} \end{cases}$$

$$\text{SECOND\_SEARCH\_EN} = \begin{cases} 1, \text{ accumulated P}-\text{SCH\_RSSI} > \text{TH2} \\ 0, \text{ otherwise} \end{cases}$$

Meanwhile, the S-SCH RSSI calculator 206 and the S-SCH energy matrix update part 208 illustrated in FIG. 3 have the same operation as the S-SCH RSSI calculator 100 and the S-SCH energy matrix update part 102 illustrated FIG. 2. The S-SCH RSSI calculator 206 calculates 16 S-SCH energy values by calculating a correlation between the first 256 chips of received signals $r_I$ and $r_Q$ and 16 secondary sync codes $SSC_k$ (k=1,2, ... , 16) at every slot. The S-SCH energy matrix update part 208 updates the S-SCH energy matrix ($S_{(i,j)}=S_{(i,j)}+E_{(i,j)}$) at every slot as in the S-SCH RSSI calculator 100 of FIG. 2, using the 16 S-SCH energy values calculated by the S-SCH RSSI calculator 206.

The S-SCH energy matrix constantly updated by the S-SCH energy matrix update part 208 is provided to the 2-stage S-SCH searcher 210. The 2-stage S-SCH searcher 210 acquires Fsync and determines a PSCG_No by performing the 2-step search on the 960 hypotheses, using the S-SCH energy matrix updated by the S-SCH energy matrix update part 208, an SSC table for the S-SCH, illustrated in FIGS. 4A to 4C, and Equation (2) given above.

The 2-stage S-SCH searcher 210 according to an embodiment of the present invention searches the hypotheses in the first and second search processes stated above. A detailed description of the first and second search processes will made below.

First Search Process

Upon receipt of the first search enable signal FIRST_SEARCH_EN (which is transitioning from '0' to '1') from the comparator 204, the 2-stage S-SCH searcher 210 calculates S-SCH energies for the 960 hypotheses using the S-SCH energy matrix updated by the S-SCH energy matrix update part 208 and the SSC table illustrated in FIGS. 4A to 4C. Thereafter, the 2-stage S-SCH searcher 210 stores, out of the 960 hypotheses, the hypotheses having the S-SCH energy value higher than the predetermined threshold FIRST_SEARCH_THRESHOLD in a hypothesis memory set for storing the hypotheses passed the first search process. The above operation is the first search operation performed by the 2-stage S-SCH searcher 210.

Second Search Process

Upon receipt of the second search enable signal SECOND_SEARCH_EN (which is transitioning from '0' to '1') from the comparator 204 after completion of the first search process, the 2-stage S-SCH searcher 210 calculates S-SCH energies for the hypotheses stored in the hypothesis memory set, using the S-SCH energy matrix updated by the S-SCH energy matrix update part 208 and the SSC table illustrated in FIGS. 4A to 4C. Thereafter, the 2-stage S-SCH searcher 210 determines the hypothesis having the maximum S-SCH energy as the Fsync and the PSCG. The above operation is the second search operation performed by the 2-stage S-SCH searcher 210.

In order to increase the efficiency of the second search process by the 2-stage S-SCH searcher 210, the start points of the first and second searches and the threshold FIRST_SEARCH_THRESHOLD for the first search must be properly set. For example, when the observation time of the received signal is too short or the threshold FIRST_SEARCH_THRESHOLD is improperly set in the first search process, the following problems (A and B) may occur:

A. Even the hypothesis which may finally become the maximum energy hypothesis cannot be included in the subject of the search in the second search, because the energy in the first search process is lower than the threshold FIRST_SEARCH_THRESHOLD.

B. The number of the hypotheses having the energy level higher than the threshold FIRST_SEARCH_THRESHOLD in the first search process is excessively large, thus increasing the number of hypotheses to be searched in the second search process.

A detailed description of the particulars that must be considered when setting the thresholds TH1 and TH2 provided to the comparator 204 and the threshold FIRST_SEARCH_THRESHOLD provided to the 2-stage S-SCH searcher 210 will be made below.

Out of the 960 hypotheses, the S-SCH energy values calculated by Equation (2) are all random variables and have the following two distributions:

Non-central chi-square distribution: one or more hypotheses having correct frame synchronization and code group (The number of hypotheses with this distribution is almost equal to the number of significant multi-paths.); and Central chi-square distribution: the remaining hypotheses.

A mean and a standard deviation of the above two probability random variables are affected by:

1) a channel environment such as the SNR and the multi-channel condition; and 2) the number of the search slots.

As the SNR of the channel increases and the number of the search slots is increased, a mean difference between the above two chi square random variables increases and variations of them become relatively smaller, resulting in an improvement of the frame sync detection performance. Accordingly, even when observing a small number of slots, a high SNR of channel causes an increase in the frame sync detection performance. Also, even when the SNR is low, the large number of the observed slots causes an increase in the frame sync detection performance. Correspondingly, when both the SNR is high and the number of the observed slots is also high, the frame sync detection performance is much higher.

A description of an operation of determining the thresholds TH1, TH2 and FIRST_SEARCH_THRESHOLD can also be given according to the two search processes.

In the first search process, most hypotheses having the energy value higher than the threshold FIRST_SEARCH_THRESHOLD will each become a hypothesis that does not have correct Fsync or PSCG. Out of the 960 hypotheses, the number of the hypotheses having the correct Fsync and PSCG is almost equal to the number of significant multi-paths. It should be noted that an object of the first search process is not to search the hypothesis having the maximum energy, but to search all the hypotheses having a given probability that they will have the maximum energy in the second search process. Therefore, it is necessary in the first search to place emphasis on increasing the detection probability rather than decreasing the false alarm probability. Accordingly, in a step of determining the threshold FIRST_SEARCH_THRESHOLD in the first search process, it is preferable to first determine the detection probability, and then determine the thresholds TH1 and FIRST_SEARCH_THRESHOLD satisfying the determined detection probability. When the detection probability is set to a specific value, the threshold FIRST_SEARCH_THRESHOLD is varied depending on the threshold TH1. If the TH1 is set to a high level to defer the start point of the first search, a mean of the non-central chi-square probability random variables increases, thus making it possible to increase the FIRST_SEARCH_THRESHOLD satisfying the detection probability. The increase in the FIRST_SEARCH_THRESHOLD is advantageous in that it decreases the false alarm probability in the first search and reduces the search time of the second search, but disadvantageous in that it defers the search start point of the first search. Conversely, if the TH1 is set to a low level, the start point of the first search advances, so that the FIRST_SEARCH_THRESHOLD satisfying the detection probability decreases. The decrease in the FIRST_SEARCH_THRESHOLD is advantageous in that the start point of the first search is advanced, but is disadvantageous in that the second search has a long search time. As stated above, since the start point of the first search and the search time of the second search are varied depending on the TH1 and the FIRST_SEARCH_THRESHOLD, the thresholds should be determined considering a trade-off between them.

The start point of the second search is varies depending on the TH2 and the SNR of the channel. As the SNR decreases and the TH2 increases, the start point of the second search is deferred more and more. In order to advance the start point of the second search, it is preferable to decrease the TH2. However, in order to decrease the false alarm probability and increase the detection probability in the second search process, it is necessary to increase the TH2. Therefore, when determining the TH2, the false alarm probability and the detection probability should be considered together with the search time in designing the system.

As described above, the present invention has the following advantages.

First, the total S-SCH search time is reduced, since the first search process is performed before the observation time of the received signal needed to detect the maximum energy hypothesis. Thereafter, only the hypotheses passed by the first search process are searched in the second search process for detecting the final maximum energy hypothesis.

Second, the start points of the first and second search processes are automatically controlled according to the SNR of the channel, because the first and second search processes are performed at the points where the accumulated RSSI of the P-SCH exceeds the TH1 and TH2 respectively. When the SNR is high, the search is performed without unnecessarily waiting a long time, thus decreasing the search time. Otherwise, when the SNR is low, the received signal is observed for a longer time, making it possible to decrease the false alarm probability and increase the detection probability in the search process.

The second feature according to an embodiment of the present invention, that is, the start point of the S-SCH search being determined by using the accumulated P-SCH RSSI value can be applicable to the conventional search as well as the 2-stage S-SCH search of the present invention. The P-SCH RSSI calculator 500 and the P-SCH RSSI accumulator 502 illustrated in FIG. 5 have the same operation as the P-SCH RSSI calculator 200 and the P-SCH RSSI accumulator 202 illustrated in FIG. 3. The comparator 504 compares the accumulated P-SCH RSSI provided from the P-SCH RSSI accumulator 502 with a predetermined threshold TH and provides the S-SCH searcher 510 with a search enable signal SEARCH_EN, which is given as follows:

$$\text{SEARCH\_EN} = \begin{cases} 1, & \text{accumulated P} - \text{SCH\_RSSI} > \text{TH1} \\ 0, & \text{otherwise} \end{cases}$$

Figure 5:
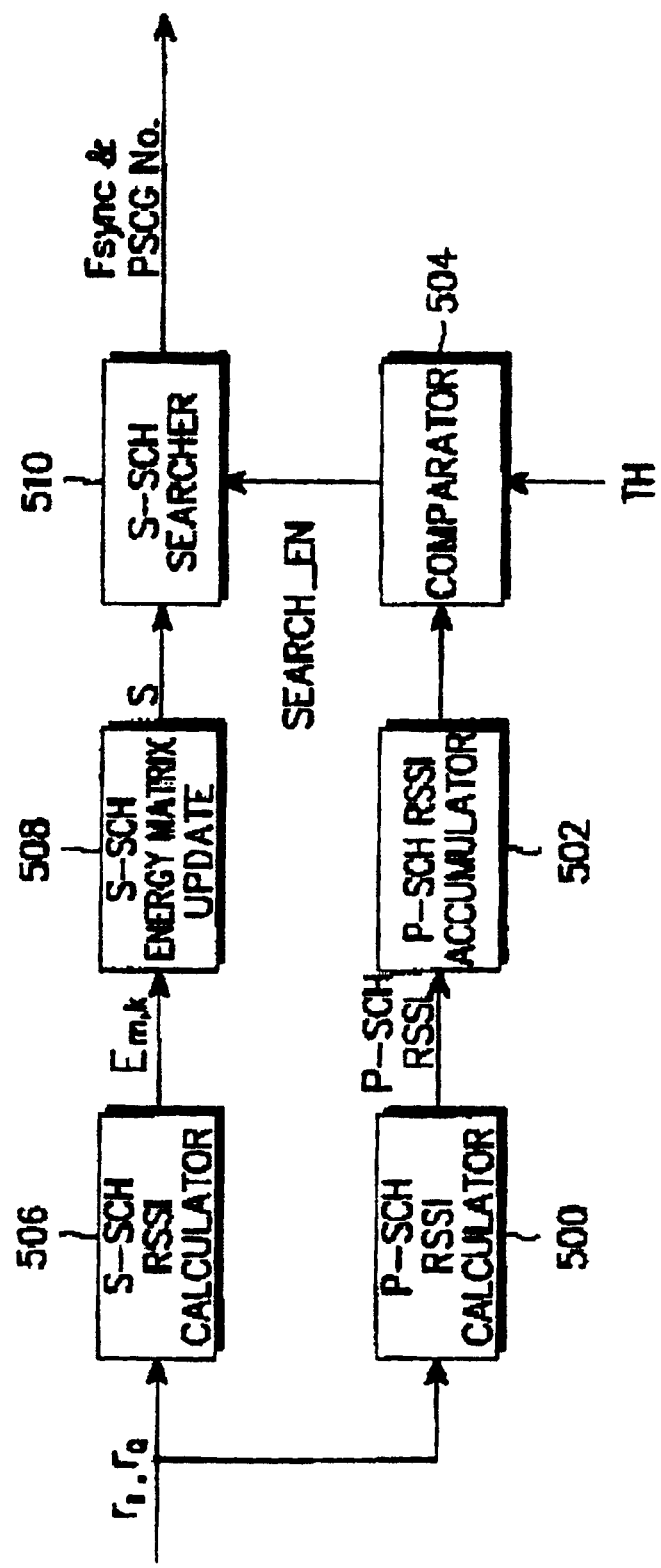
FIG. 5 is a block diagram illustrating an apparatus for searching an S-SCH according to another embodiment of the present invention.

Meanwhile, the S-SCH RSSI calculator 506 and the S-SCH energy matrix update part 508 illustrated in FIG. 5 have the same operation as the S-SCH RSSI calculator 100 and the S-SCH energy matrix update part 102 illustrated in FIG. 2. The only difference in operation between the S-SCH searcher 510 illustrated in FIG. 5 and the S-SCH searcher 104 illustrated in FIG. 2 is that the S-SCH searcher 104 starts the S-SCH search for a predetermined time period, however, the S-SCH searcher 510 starts the S-SCH search when the search enable signal SEARCH_EN is applied from the comparator 504.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A method for searching a base station in a mobile communications system, in which a mobile station acquires slot timing synchronization from a first signal on a primary sync channel (P-SCH) out of the primary sync channel and a secondary sync channel (S-SCH) used for the base station search, acquires frame timing synchronization from a second signal on the S-SCH, and determines a primary scrambling code group (PSCG) corresponding to the primary scrambling codes used by the respective base stations, the method comprising the steps of:

calculating S-SCH channel received signal strength indicator (RSSI) values from the second signal at every slot in one frame, and updating S-SCH RSSI values corresponding to the one frame as energy matrix values;

calculating energy hypotheses corresponding to the energy matrix values using the energy matrix values and a predetermined secondary sync code (SSC) table in response to a first search command, and determining energy hypotheses having a value higher than a predetermined threshold as passed hypotheses; and calculating energy values for the passed hypotheses using the determined passed hypotheses and the SSC table in response to a second search command, and determining an energy hypothesis having a maximum energy as the frame timing synchronization and the primary scrambling code group.

2. The method as claimed in claim 1, further comprising the steps of:

calculating and accumulating P-SCH RSSI values from the first signal at every slot; and comparing the accumulated P-SCH RSSI values with first and second accumulation thresholds and providing the first and second search commands.

3. A method for searching a base station in a mobile communications system, in which a mobile station acquires slot timing synchronization from a first signal on a primary sync channel (P-SCH) out of the primary sync channel and a secondary sync channel (S-SCH) used for the base station search, acquires frame timing synchronization from a second signal on the S-SCH, and determines a primary scrambling code group (PSCG) corresponding to the primary scrambling codes used by the respective base stations, the method comprising the steps of:

calculating and accumulating P-SCH RSSI values from the first signal at every slot;

comparing the accumulated P-SCH RSSI values with first and second accumulation thresholds and providing first and second search commands;

calculating S-SCH RSSI values from the second signal at every slot and updating S-SCH RSSI values corresponding to the one frame as energy matrix values;

calculating energy hypotheses corresponding to the energy matrix values using the energy matrix values and a predetermined SSC table in response to the first search command, and determining energy hypotheses having a value higher than a predetermined threshold as passed hypotheses; and calculating energy values for the passed hypotheses using the determined passed hypotheses and the SSC table in response to the second search command, and determining an energy hypothesis having a maximum energy as the frame timing synchronization and the primary scrambling code group.

4. An apparatus for searching a base station in a mobile communications system, in which a mobile station acquires slot timing synchronization from a first signal on a primary sync channel (P-SCH) out of the primary sync channel and a secondary sync channel (S-SCH) used for the base station search, acquires frame timing synchronization (Fsync) from a second signal on the S-SCH, and determines a primary scrambling code group (PSCG) corresponding to the primary scrambling codes used by the respective base stations, the apparatus comprising:

a secondary sync channel signal energy calculating and updating part for calculating S-SCH RSSI values from the second signal at every slot in one frame, and updating S-SCH RSSI values corresponding to the one frame as energy matrix values;

a search command provider for calculating and accumulating P-SCH RSSI values from the first signal at every slot, comparing the accumulated P-SCH RSSI values with first and second accumulation thresholds, and providing first and second search commands; and a secondary sync channel (S-SCH) searcher for performing a first search process of calculating energy hypotheses corresponding to the energy matrix values using the energy matrix values and a predetermined SSC table in response to the first search command and determining energy hypotheses having a value higher than a predetermined threshold as passed hypotheses, and a second search process of calculating energy values for the passed hypotheses using the determined passed hypotheses and the SSC table in response to the second search command and determining an energy hypothesis having a maximum energy as the frame timing synchronization and the primary scrambling code group.

5. The apparatus as claimed in claim 4, wherein the search command provider comprises:

a P-SCH RSSI calculator for calculating P-SCH RSSI values from the first signal at every slot;

a P-SCH accumulator for accumulating the calculated P-SCH RSSI values; and a comparator for comparing the accumulated P-SCH RSSI values with the first and second accumulation thresholds and selectively providing the first and second search commands to the S-SCH searcher.

6. A method for searching a base station in a mobile communications system, in which a mobile station acquires slot timing synchronization from a first signal on a primary sync channel (P-SCH) out of the primary sync channel and a secondary sync channel (S-SCH) used for the base station search, acquires frame timing synchronization from a second signal on the S-SCH, and determines a primary scrambling code group (PSCG) corresponding to the primary scrambling codes used by the respective base stations, the method comprising the steps of:

calculating received signal strength indicator (RSSI) values from the second signal at every slot in one frame having a plurality of slots, and updating the RSSI values corresponding to the one frame as energy matrix values;

calculating and accumulating received RSSI values from the first signal at every slot;

comparing the accumulated RSSI values with a predetermined accumulated threshold value and selectively providing a search command; and calculating energy hypotheses corresponding to the plurality of RSSI values by using said RSSI values and a predetermined secondary synchronization code table in response to the search command and determining an energy hypothesis having a maximum energy among the calculated energy hypotheses as the frame timing synchronization and the primary scrambling code group.

7. An apparatus for searching a base station in a mobile communications system, in which a mobile station acquires slot timing synchronization from a first signal on a primary sync channel (P-SCH) out of the primary sync channel and a secondary sync channel (S-SCH) used for the base station search, acquires frame timing synchronization from a second signal on the S-SCH, and determines a primary scrambling code group (PSCG) corresponding to the primary scrambling codes used by the respective base stations, the apparatus comprising:

a secondary sync channel signal energy calculating and updating part for calculating received signal strength indicator (RSSI) values from the second signal at every slot in one frame having a plurality of slots, and updating the RSSI values corresponding to the one frame as energy matrix values;

a search command provider for calculating and accumulating received RSSI values from the first signal at every slot, and comparing the accumulated RSSI values with a predetermined accumulated threshold value and selectively providing a search command; and a secondary sync channel searcher for calculating energy hypotheses corresponding to the plurality of RSSI values by using said RSSI values and a predetermined secondary synchronization code table in response to the search command and determining an energy hypothesis having a maximum energy among the calculated energy hypotheses as the frame timing synchronization and the primary scrambling code group.

\* \* \* \* \*